United States Patent [19]

Hallstrom, Jr.

[11] Patent Number: 5,263,573
[45] Date of Patent: Nov. 23, 1993

[54] DRIVE CONNECTOR FOR RECIPROCATING CONVEYOR

[76] Inventor: Olof A. Hallstrom, Jr., 1920 Hallstrom Rd., Tillamook, Oreg. 97141

[21] Appl. No.: 778,769

[22] Filed: Oct. 21, 1991

Related U.S. Application Data

[63] Continuation of Ser. No. 603,058, Oct. 25, 1990, abandoned.

[51] Int. Cl.⁵ .............................................. B65G 25/00
[52] U.S. Cl. ...................................... 198/750; 198/775
[58] Field of Search ................. 198/750, 774.1, 775; 414/525.1, 525.9

[56] References Cited

U.S. PATENT DOCUMENTS

| | | | |
|---|---|---|---|
| 3,534,875 | 10/1970 | Hallstrom, Jr. | 198/750 X |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,691,819 | 9/1987 | Hallstrom, Jr. | 198/750 |
| 4,709,805 | 12/1987 | Foster | 198/750 |
| 4,899,870 | 2/1990 | Foster | 198/750 |
| 4,907,691 | 3/1990 | Foster | 198/750 |
| 4,966,275 | 10/1990 | Hallstrom, Jr. | 198/750 |

FOREIGN PATENT DOCUMENTS 0158398 10/1985 European Pat. Off. ............ 198/750

Primary Examiner—Cheryl L. Gastineau
Attorney, Agent, or Firm—Olson & Olson

[57] ABSTRACT

A reciprocating conveyor includes a plurality of groups of reciprocating slats supported on a main frame, each group of slats being connected to a separate drive beam by releasable clamp bolts extending through laterally elongated openings in the drive beam for accommodating alignment of the slats with adjacent slats. The drive beams are connected detachably to the piston rods of hydraulic piston-cylinder drive units through quickly attachable and detachable clamps, and the drive units are formed as a drive module that is readily attached to and detached from the main support frame.

10 Claims, 4 Drawing Sheets

DRIVE CONNECTOR FOR RECIPROCATING CONVEYOR

This application is a continuation of application Ser. No. 07,603,058, filed Oct. 25, 1990.

BACKGROUND OF THE INVENTION

This invention relates to reciprocating conveyors, and more particularly to the connected assembly of conveyor slats, slat drive beams and reciprocative power drive.

This invention relates to reciprocating conveyors of the type disclosed in my earlier U.S. Pat. Nos. 4,143,760; 4,144,963; and 4,856,645 and provides more simplified and versatile means for detachably connecting together the conveyor slats, slat drive beams and reciprocative power drive on the supporting framework of a reciprocating conveyor.

SUMMARY OF THE INVENTION

This invention provides a reciprocating conveyor with a module which is detachable from the conveyor main frame and which includes the drive cylinders and couplers for releasably attaching the drive cylinders to the slat drive beams, and adjustable clamp mechanism for releasably securing the conveyor slats to the slat drive beams.

It is the principal objective of this invention to provide a reciprocating conveyor with a power drive that is quickly attachable to and detachable from the main frame for facilitating assembly, maintenance and repair.

Another object of this invention is the provision of a reciprocating conveyor with conveyor slats that are quickly attachable to and detachable from the slat drive beams for facilitating assembly, maintenance and repair.

A further objective of this invention is the provision of a reciprocating conveyor of simplified construction for economical manufacture, maintenance and repair.

The foregoing and other objects and advantages of this invention will appear from the following detailed description, taken in connection with the accompanying drawings of a preferred embodiment.

DESCRIPTION OF THE PREFERRED EMBODIMENT

Figure 1:
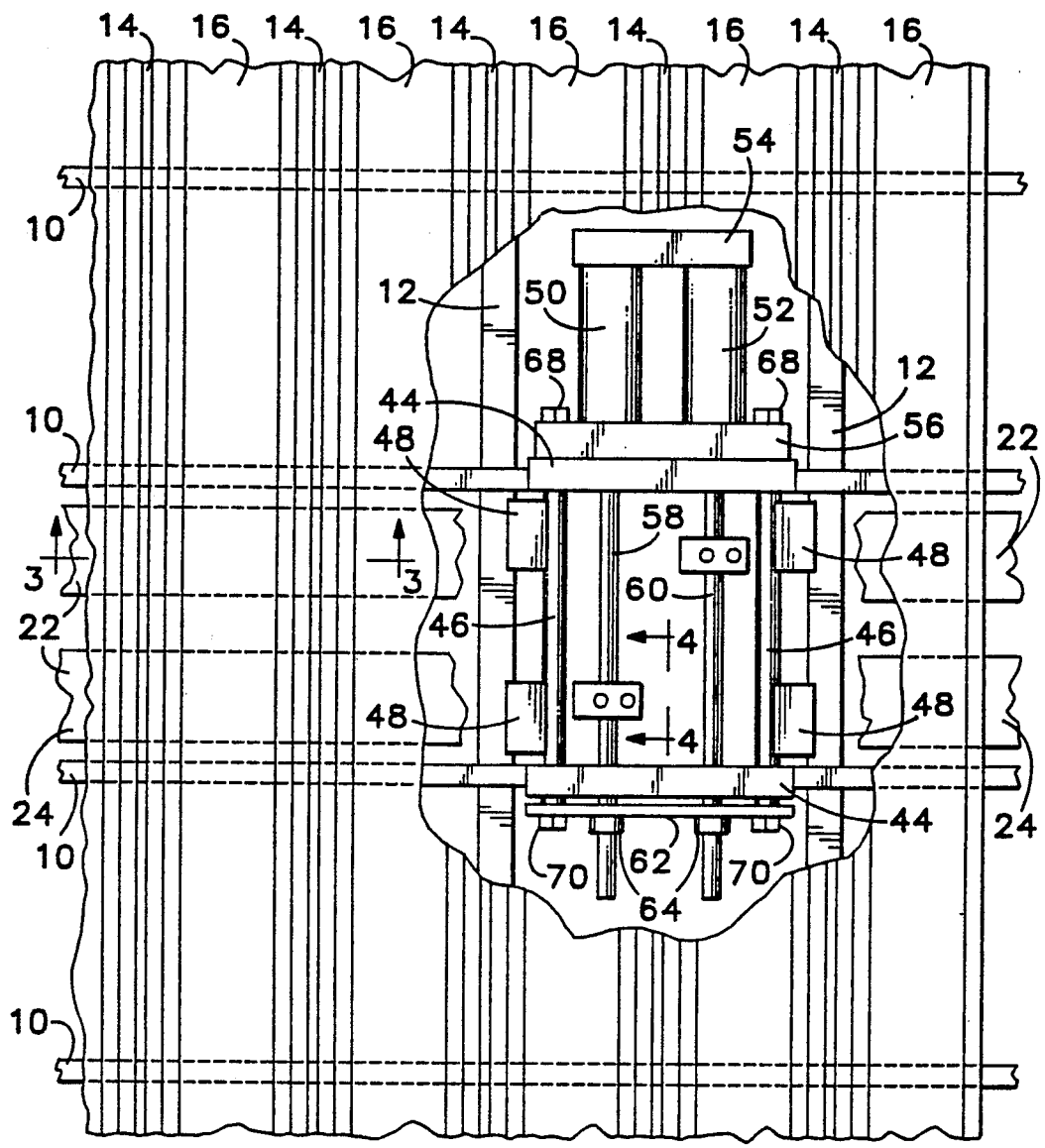
FIG. 1 is a fragmentary plan view of a reciprocating conveyor embodying the features of this invention, a portion being broken away to disclose internal features of construction.
Figure 2:
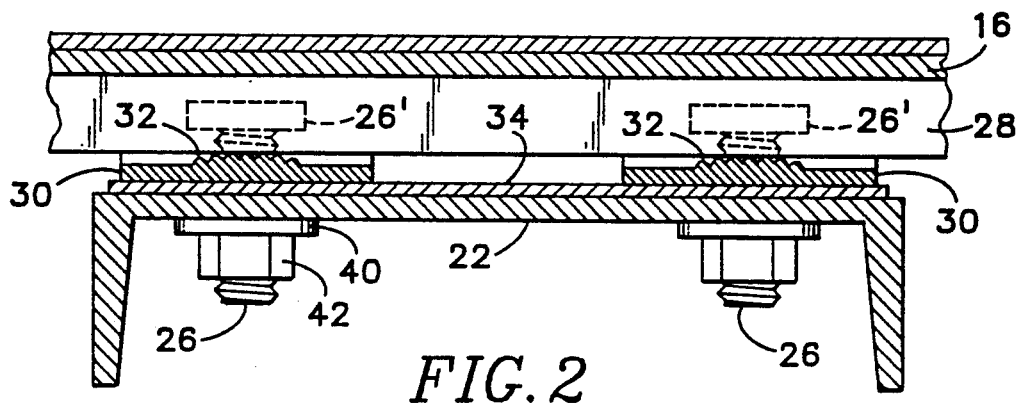
FIG. 2 is a fragmentary sectional view taken on the line 2—2 in FIG. 3.
Figure 3:
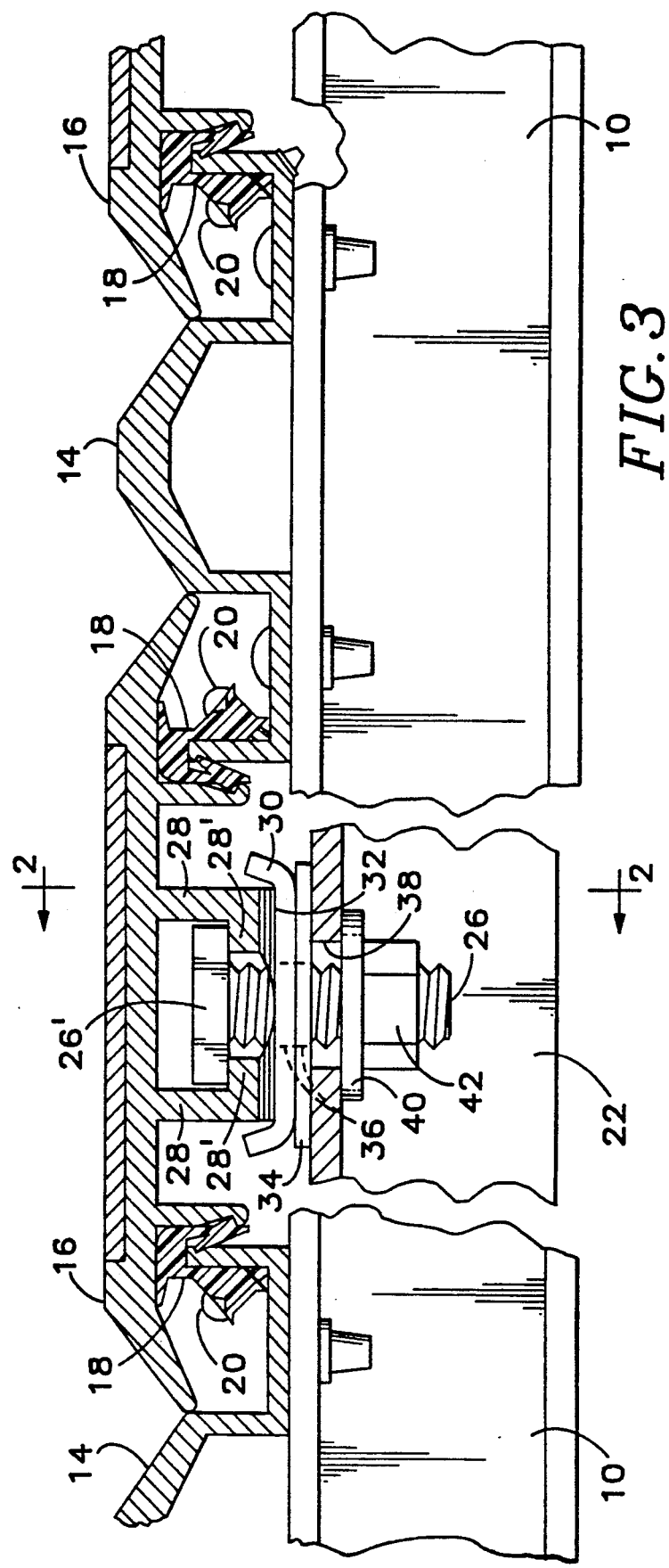
FIG. 3 is a fragmentary sectional view taken on the line 3—3 in FIG. 1 is a portion being broken away to disclose internal structure.

FIG. 1 illustrates the type of reciprocating conveyor disclosed in detail in my U.S. Pat. No. 4,856,645. Its basic components are a plurality of transversely extending frame beams 10 secured in longitudinally spaced apart arrangement to laterally spaced, longitudinally extending frame beams 12.

In the illustrated embodiment, the reciprocating conveyor includes a plurality of elongated fixed slats 14 supported upon and secured to the beams of the conveyor main frame in alternate arrangement with a plurality of elongated reciprocative slats 16. The reciprocative slats are secured releasably to the fixed slats against vertical displacement by elongated flexible clips 18 which also serve as lubricating bearings for enhancing the reciprocative movement of the slats 16 relative to the fixed slats 14. For this purpose the clips are made of synthetic resin or other material having a low co-efficient of friction. The clips are secured to the fixed slats against longitudinal displacement by such means as the rivets 20.

The reciprocative slats 16 are arranged in groups and each group is connected to a different transverse drive beam. In the illustrated embodiment, there are two groups of reciprocative slats and therefore two drive beams 22 and 24.

The foregoing general structural arrangement is described in detail in my earlier U.S. Pat. No. 4,856,645.

In accordance with this invention, the reciprocative slats 16 are releasably attached to their associated transverse drive beams 22, 24 by clamp bolts 26. Each slat is formed with a pair of angle clamp brackets 28 which project downwardly from the underside of the slat and have inturned bottom ends 28' which form a narrow slot between them. The enlarged head 26' of each clamp bolt is received in the slot and bears against the upper surface of the inturned ends 28'.

The undersides of the brackets 28 rest upon a pair of clamp saddles 30, one associated with each bolt 26. Each clamp saddle preferably is made of steel, or other suitably hard material, and is provided with upturned lateral edges. Extending between said lateral edges is a plurality of longitudinally spaced, laterally extending ridges which form upwardly projecting teeth 32. The teeth are disposed to engage the undersurface of the brackets 28 and secure the latter, and hence the slat 16 against displacement relative to the associated drive beam 22, 24.

Each pair of saddles 30 is secured in longitudinally spaced position to a mounting plate 34, as by welding. A hole 36 is provided through each saddle and underlying mounting plate for the passage of the shank of bolt 26. Each bolt shank then passes downwardly through a laterally elongated opening 38 in the upper, intermediate portion of the channel shaped drive beam 22, 24. The enlarged openings 38 accommodate a degree of lateral adjustment of each reciprocative slat 16 relative to its associated drive beam. A washer 40 and nut 42 on each bolt 26 under the drive beam serve to releasably clamp the slat to its associated drive beam between the bolt head 28' and washer 40.

Figure 6:
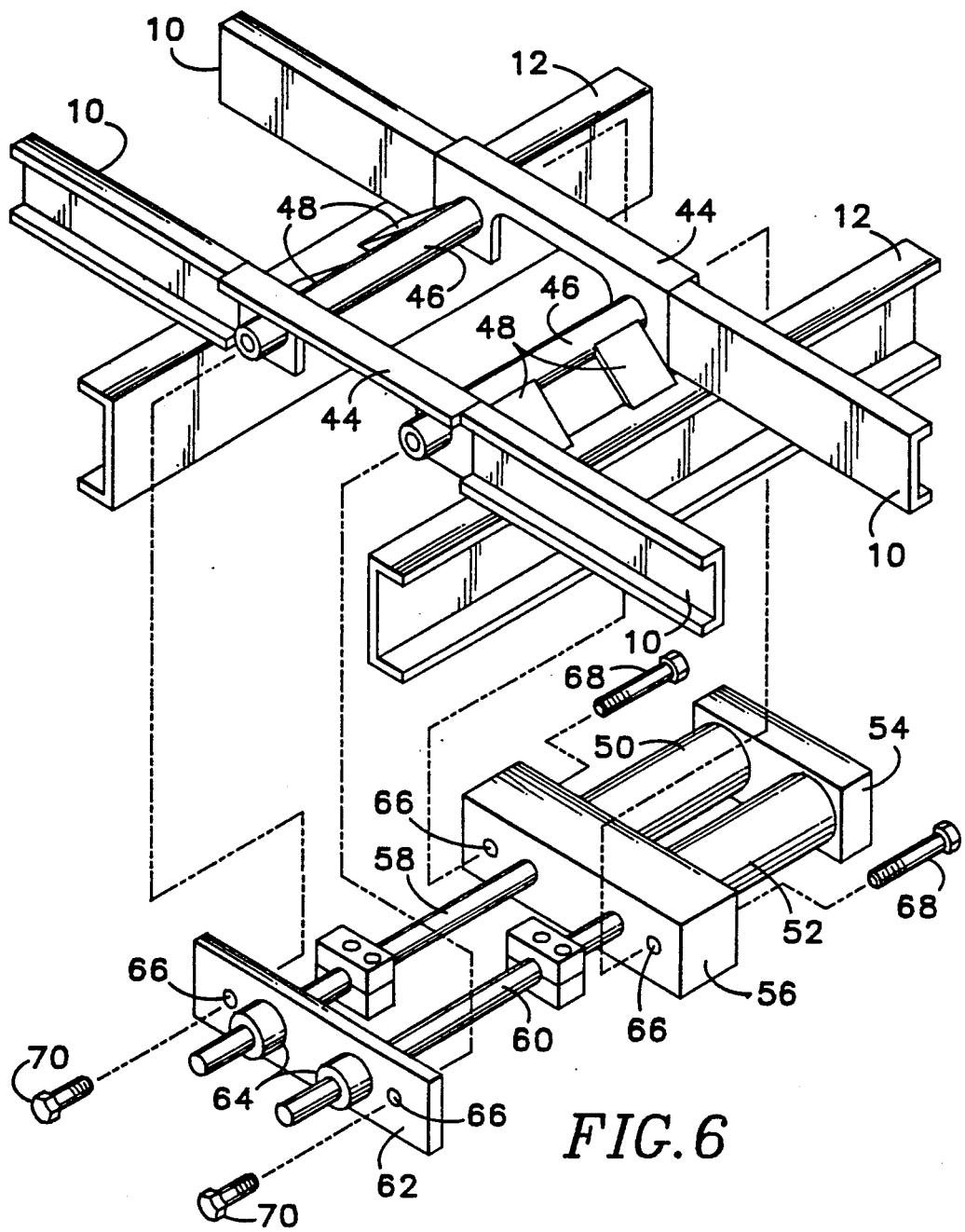
FIG. 6 is a fragmentary exploded view showing the manner of detachable connection of components of the drive module to the conveyor main frame.

Novel means is provided for connecting each slat drive beam 22, 24 to its associated power drive. Referring primarily to FIGS. 1 and 6 of the drawings, a drive module support frame is formed of a pair of transverse beams 44 spaced apart longitudinally by a pair of laterally spaced, longitudinally extending tubular beams 46. The transverse beams 44 are L-shaped in cross section and each is secured permanently, as by welding, to the confronting, laterally spaced ends of an interrupted transverse main frame beam 10. The tubular beams 46 preferably are secured permanently, as by welded spacer plates 48, to a pair of adjacent longitudinal main frame beams 12.

The above described modular support frame removably mounts a power drive system for reciprocating the transverse drive beams 22, 24 and hence the two groups of load supporting and conveying slats 16. Since the conveyor is illustrated in FIG. 1 to include two drive beams 22 and 24, and hence two groups of slats 16 to be reciprocated in a load-conveying operation, the power drive system includes two fluid pressure piston-cylinder drive units, preferably hydraulic, for operative association with the two drive beams. The cylinders 50 and 52 of the drive units are joined at their head ends by a transverse connector beam 54 and at their rod ends by a transverse connector beam 56. Openings in the beam 56 freely receive therethrough the piston rods 58 and 60 extending from the cylinders 50 and 52, respectively. A similarly apertured transverse plate 62 freely receives the piston rods adjacent their outer ends. Guide sleeves 64 on the plate provide bearings for slidably supporting the piston rods for reciprocation.

The transverse beam 56 and plate 62 also are provided with apertures 66 which are spaced apart for registry with tubular beams 46. Elongated bolts 68 and 70 extend removably through the registering apertures 66 and into internal end threads in tubes 46 to clamp the power drive module removably to the module support frame.

Figure 4:
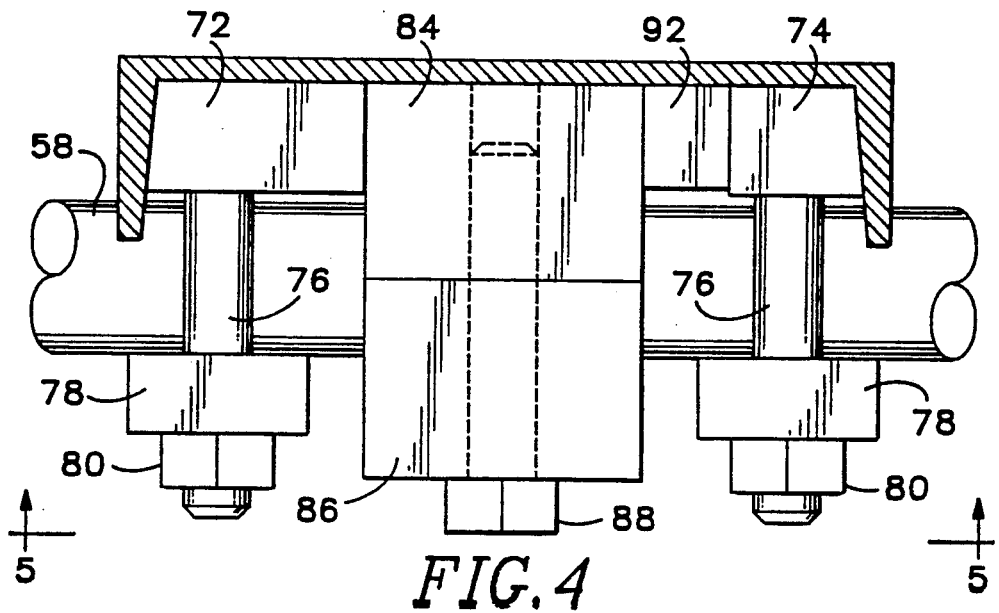
FIG. 4 is a fragmentary sectional view taken on the line 4—4 in FIG. 1.

Novel means is provided for detachably connecting the piston rods 58 and 60 to the slat drive beams 22 and 24, respectively. Secured, as by welding, to the underside of the associated channel shaped drive beam (22 in FIGS. 4 and 5) adjacent the downwardly extending side segments of the beam are a pair of anchor blocks 72 and 74 from each of which a pair of spaced clamp bolts 76 project. The bolts are arranged to receive the piston rod 58 between them. A clamp plate 78 is associated with each anchor block and associated pair of clamp bolts, and is provided with spaced openings to receive the clamp bolts therethrough. A nut 80 is fitted onto the threaded end of each clamp bolt for moving the clamp plate toward the piston rod 58 which is interposed between the clamp plate and the associated anchor block.

Each of the downwardly extending side segments of the drive beam 22 is provided with an arcuate groove 82. The grooves are aligned in the transverse direction of the beam and are configured to seat the piston rod 58. By tightening the clamp nuts 80, the clamp plates 78 press the piston rod firmly into the grooves 82 to clamp the piston rod firmly to the drive beam 22.

Positioned between the anchor blocks 72 and 74 is a pair of clamp blocks 84 and 86 provided with confronting half round grooves for receiving the piston rod 58. A pair of clamp bolts 88 extend through unthreaded openings in clamp block 86 and into threaded openings in clamp block 84. The bolts function to clamp the blocks 84 and 86 securely to the piston rod.

Figure 5:
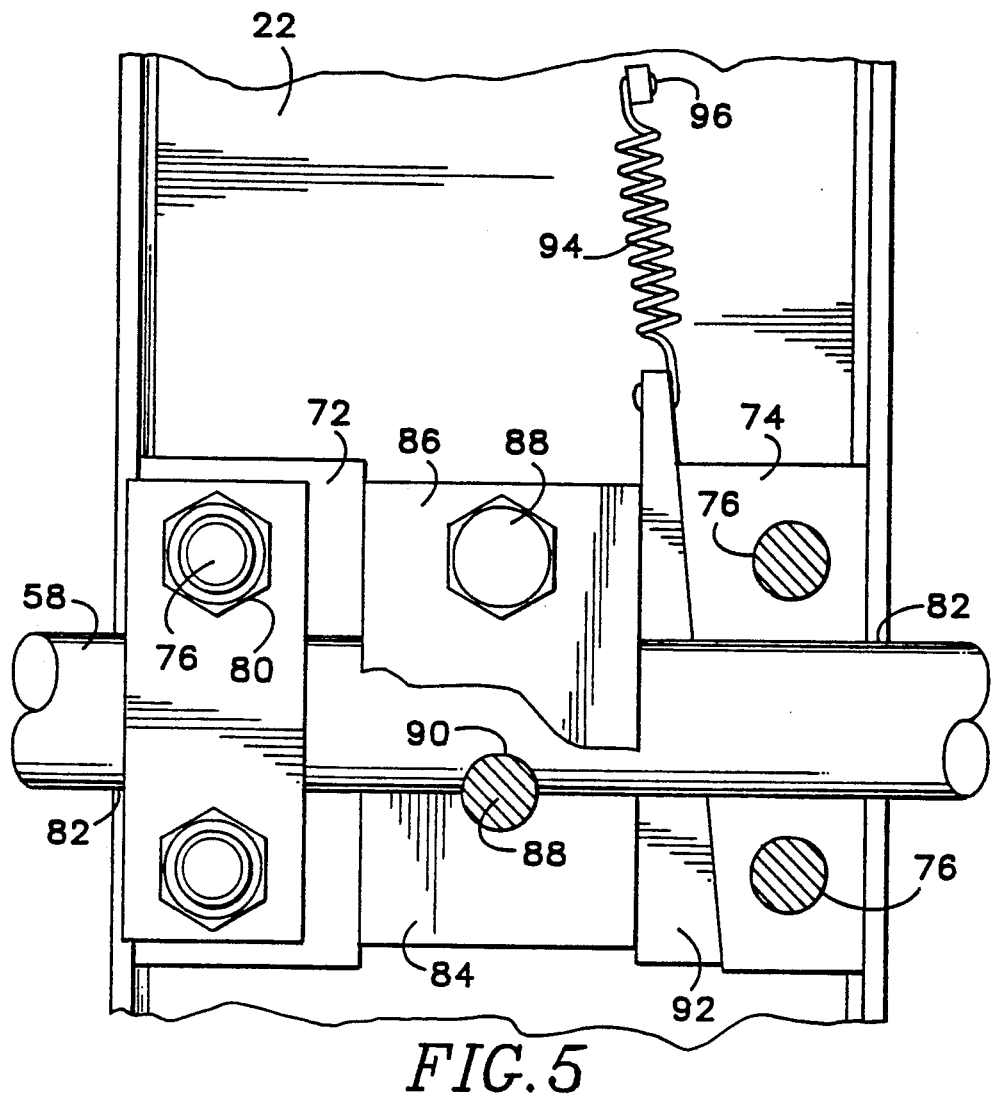
FIG. 5 is a fragmentary bottom plan view as viewed in the direction of the arrows 5—5 in FIG. 4.

To insure against axial displacement of the piston rod 58 relative to the clamp blocks 84 and 86, the openings for at least one of the bolts are disposed to intercept a portion of the circumference of the piston rod (FIG. 5). An arcuate notch 90 is provided in the piston rod to register with the openings for the clamp bolt. The bolt thus effectively secures the piston rod and clamp blocks against axial displacement.

The secured clamp blocks 84, 86 are retained positively between the anchor blocks 72 and 74 by means of a wedge block 92. As best shown in FIG. 5, the anchor block 74 is provided with an inwardly facing surface that is spaced from and forms with the confronting face of the clamp block 84 a relatively small arcuate angle. The wedge block 92 is received slidably within that space and is movable to provide wedging pressure against the clamp block 8 to clamp it frictionally against the opposite anchor block 72. A spiral tension spring 94 is secured at one end to the narrow end of the wedge block and at the other end to an anchor 96 on the drive beam 22. The wedge block thus is urged resiliently in the direction of increasing wedging pressure, to ensure maximum retention of the clamp blocks 84 and 86.

From the foregoing description it will be appreciated that the arrangement of clamp bolts 26 and saddle 30 facilitates assembly and alignment of the slats, as well as disassembly for maintenance and repair. The arrangement of the modular support frame 44 and 46, modular power drive system 50-70 and clamp assembly 72-96 facilitates connection and alignment of the slat drive beams with the piston rods of the power drive and affords rapid installation and removal of the power drive module for efficient maintenance and repair.

It will be apparent to those skilled in the art that various changes and modifications may be made in the size, shape, type, number and arrangement of parts described hereinbefore without departing from the spirit of this invention and the scope of the appended claims.

I claim:

1. A reciprocating conveyor, comprising:
   a) an elongated main frame,
   b) a plurality of longitudinally extending elongated load engaging reciprocative slats mounted on the main frame and arranged in a plurality of slat groups,
   c) a plurality of drive beams extending transversely of the slats, each drive beam being associated with a different group of slats,
   d) slat clamp means releasably interconnecting each slat and its associated drive beam,
   e) a drive module including module frame means and a plurality of fluid pressure piston-cylinder drive units secured to the module frame means and forming an integral drive module,
   f) releasable connector means detachably interconnecting the drive module frame means and the main frame for securing the integral drive module removably to the main frame, and
   g) connecting means for detachably securing each of said drive units to a different one of the drive beams for reciprocating said drive beam.

2. The reciprocating conveyor of claim 1 wherein the connector means includes module support frame means secured integrally to the main frame and configured to detachably mount the module frame means.

3. A reciprocating conveyor, comprising:
   a) an elongated main frame,
   b) a plurality of longitudinally extending elongated load engaging reciprocative slats mounted on the main frame and arranged in a plurality of slat groups,
   c) a plurality of drive beams extending transversely of the slats, each drive beam being associated with a different group of slats,
   d) slat clamp means releasably interconnecting each slat and its associated drive beam, the slat clamp means including
      1) a clamp bolt having an enlarged head, 2) bracket means on the underside of the slat configured to receive and retain the clamp bolt head,
3) a saddle member interposed between the bracket means and drive beam,
4) the clamp bolt extending downwardly through openings in the saddle member and drive beam,
5) a clamp nut on the clamp bolt for clamping between the bolt head and clamp nut the bracket means, saddle member and drive beam, and
e) a plurality of fluid pressure piston-cylinder drive units each connected detachably to a different one of the drive beams for reciprocating said drive beam.

4. The reciprocating conveyor of claim 3 wherein the opening in the drive beam is wider in the lateral direction of the slat than the diameter of the clamp bolt, to allow lateral adjustment of the slat relative to an adjacent slat.

5. A reciprocating conveyor, comprising:
a) an elongated main frame,
b) a plurality of longitudinally extending elongated load engaging reciprocative slats mounted on the main frame and arranged in a plurality of slat groups,
c) a plurality of drive beams extending transversely of the slats, each drive beam connecting a different group of slats,
d) a plurality of fluid pressure piston-cylinder drive units, each associated with a different one of the drive beams for reciprocating said drive beam,
e) drive module frame means mounting the plurality of drive units and forming therewith an integral drive module,
f) module support frame means secured integrally to the main frame,
g) releasable connector means detachably interconnecting the drive module frame means and the module support frame means for securing the integral drive module removably to the main frame, and
h) drive beam clamp means releasably interconnecting each drive beam and the associated drive unit.

6. A reciprocating conveyor, comprising:
a) an elongated main frame,
b) a plurality of longitudinally extending elongated load engaging reciprocative slats mounted on the main frame and arranged in a plurality of slat groups,
c) a plurality of channel chamber drive beams extending transversely of the slats, each drive beam connecting a different group of slats,
d) a plurality of fluid pressure piston-cylinder drive units, each associated with a different one of the drive beams for reciprocating said drive beam,
e) module frame means mounting the plurality of drive units and forming therewith an integral assembly,
f) module support frame means secured integrally to the main frame and configured to detachably mount the module frame means to allow removal of the integral assembly from the main frame, and
g) drive beam clamp means releasably interconnecting each drive beam and the associated drive unit, the drive beam clamp means including laterally aligned recesses in the end segments of the channel shaped drive beam configured to seat the piston rod, and a pair of laterally spaced clamp members on the drive beam spanning the piston rod and operable to press the piston rod into said aligned recesses.

7. The reciprocating conveyor of claim 6 including a pair of piston rod clamp blocks confining the piston rod therebetween, a pair of clamp bolts interconnecting said pair of clamp blocks for clamping said blocks to the piston rod, the clamp blocks being positioned between the pair of laterally spaced clamp members, and a wedge block between the clamp blocks and one of the pair of clamp members for pressing the clamp block against the other of said pair of clamp members.

8. The reciprocating conveyor of claim 7 wherein at least one of the pair of clamp bolts intercepts the circumference of the piston rod, and a notch in the piston rod registers with said clamp bolt to secure the piston rod an pair of clamp blocks against axial displacement.

9. The reciprocating conveyor of claim 7 including resilient means engaging the wedge block and urging the wedge block toward increasing wedging pressure.

10. A reciprocating conveyor, comprising:
a) an elongated main frame,
b) a plurality of longitudinally extending elongated load engaging reciprocative slats mounted on the main frame and arranged in a plurality of slat groups,
c) a plurality of drive beams extending transversely of the slats, each drive beam being associated with a different group of slats,
d) slat clamp means releasably interconnecting each slat and its associated drive beam, the slat clamp means including:
1) a clamp bolt having an enlarged head,
2) bracket means on the underside of the slat configured to receive and retain the clamp bolt head,
3) a saddle member interposed between the bracket means and drive beam,
4) the clamp bolt extending downwardly through openings in the saddle member and drive beam, the opening in the drive beam being wider in the lateral direction of the slat than the diameter of the clamp bolt, to allow lateral adjustment of the slat relative to an adjacent slat, and
5) a clamp nut on the clamp bolt for clamping between the bolt head and clamp nut the bracket means, saddle member and drive beam,
e) a plurality of fluid pressure piston-cylinder drive units each connected to a different one of the drive beams for reciprocating said drive beam,
f) module frame means mounting the drive units,
g) module support frame means secured integrally to the main frame and configured to detachably mount the module frame means with drive units, and
h) drive beam clamp means releasably interconnecting each drive beam and the associated drive unit, the drive beam being of channel shape and the drive beam clamp means including:
1) laterally aligned recesses in the end segments of the channel shaped drive beam configured to seat the piston rod, a pair of laterally spaced clamp members on the drive beam spanning the piston rod and operable to press the piston rod into said aligned recesses,
2) a pair of piston rod clamp blocks confining the piston rod therebetween, a pair of clamp bolts interconnecting said pair of clamp blocks for clamping said blocks to the piston rod, the clamp blocks being positioned between the pair of laterally spaced clamp members, and a wedge block between the clamp blocks and one of the pair of clamp members for pressing the clamp blocks against the other of said pair of clamp members, 3) at least one of the pair of clamp bolts intercepting the circumference of the piston rod, and a notch in the piston rod registering with said clamp bolt to secure the piston rod registering with said clamp bolt to secure the piston rod and pair of clamp blocks against axial displacement, and 4) resilient means engaging the wedge block and urging the wedge block toward increasing wedging pressure.

* * * * *

UNITED STATES PATENT AND TRADEMARK OFFICE
CERTIFICATE OF CORRECTION

PATENT NO. : 5,263,573
DATED : 23 November 1993
INVENTOR(S) : Olof A. Hallstrom, Jr.

It is certified that error appears in the above-identified patent and that said Letters Patent is hereby corrected as shown below:

Column 4, line 66, "the" should read --each--.
" 5, " 49, "chamber" should read --shaped--.
" 6, " 10, "block" " " --blocks--.
" 6, " 16, "an" " " --and--.

Signed and Sealed this

Twenty-fifth Day of October, 1994

Attest:

BRUCE LEHMAN

Attesting Officer    Commissioner of Patents and Trademarks